(No Model.) 6 Sheets—Sheet 4.
C. F. BROWN.
CASH REGISTER AND INDICATOR.
No. 458,143. Patented Aug. 18, 1891.

WITNESSES
Marcus L. Byng.
Arthur E. Dowell

Fig. 4.

INVENTOR
Chas. F. Brown
by J. A. Alexander
Attorney

(No Model.)  6 Sheets—Sheet 5.

C. F. BROWN.
CASH REGISTER AND INDICATOR.

No. 458,143. Patented Aug. 18, 1891.

WITNESSES
Marcus L. Byng
Arthur E. Dowell

INVENTOR
Chas. F. Brown
J. A. Alexander
Attorney (No Model.) 6 Sheets—Sheet 6.

C. F. BROWN.
CASH REGISTER AND INDICATOR.

No. 458,143. Patented Aug. 18, 1891.

WITNESSES
Marcus L. Byng.
Arthur E. Dowell

INVENTOR
Chas. F. Brown
W. M. Alexander
Attorney

UNITED STATES PATENT OFFICE.

CHARLES FRANKLIN BROWN, OF YONKERS, NEW YORK, ASSIGNOR TO THE ROYAL MACHINE COMPANY, OF SAME PLACE.

CASH REGISTER AND INDICATOR.

SPECIFICATION forming part of Letters Patent No. 458,143, dated August 18, 1891.

Application filed January 7, 1891. Serial No. 377,014. (No model.)

*To all whom it may concern:*

Be it known that I, CHARLES FRANKLIN BROWN, of the city of Yonkers, in the county of Westchester and State of New York, have invented certain new and useful Improvements in Cash-Registers; and I do hereby declare that the following is a full, clear, and exact description thereof, reference being had to the accompanying drawings, and to the letters of reference marked thereon, which form part of this specification, in which—

This invention is an improvement in what are commonly called "cash-registers;" and its objects are to provide a combined money-drawer and calculating-machine, whereby the amounts of sale can be entered and the amount of each sale shown at the time to the customer and seller, and the entire amount in dollars and cents appear together as one sum, and not on different cards at different points. Another object is to provide devices whereby the drawer can not be partially opened or partially closed, but must be opened fully or closed fully, to make the drawer in closing shift the dial-plates to zero ready to indicate the next sale, to employ rotatable disks in place of cards, and to dispense with key-levers, thereby simplifying the machine.

To effect these objects my invention consists, first, in rotatable dial-plates and independent operating mechanisms for each; second, in a simple mechanism for operating the several plates from a number of keys; third, in novel devices for causing the plates to return to naught after each sale upon the closing of the drawer; fourth, devices for releasing and fastening the drawer, and, fifth, in devices for calculating the entire amount of sales, and in combination with the foregoing various other minor devices useful in such machines, all of which will be hereinafter fully explained.

Figure 1:
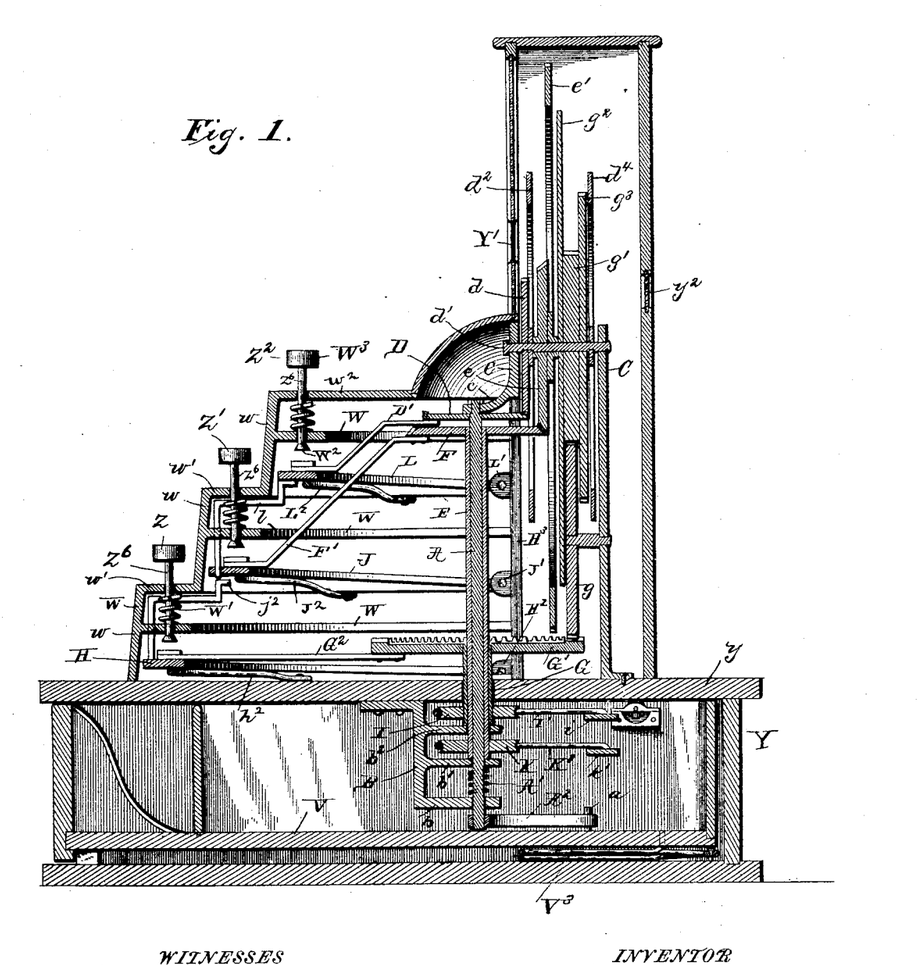
Figure 1 is a central vertical longitudinal section through my improved cash-register and calculating-machine.
Figure 2:
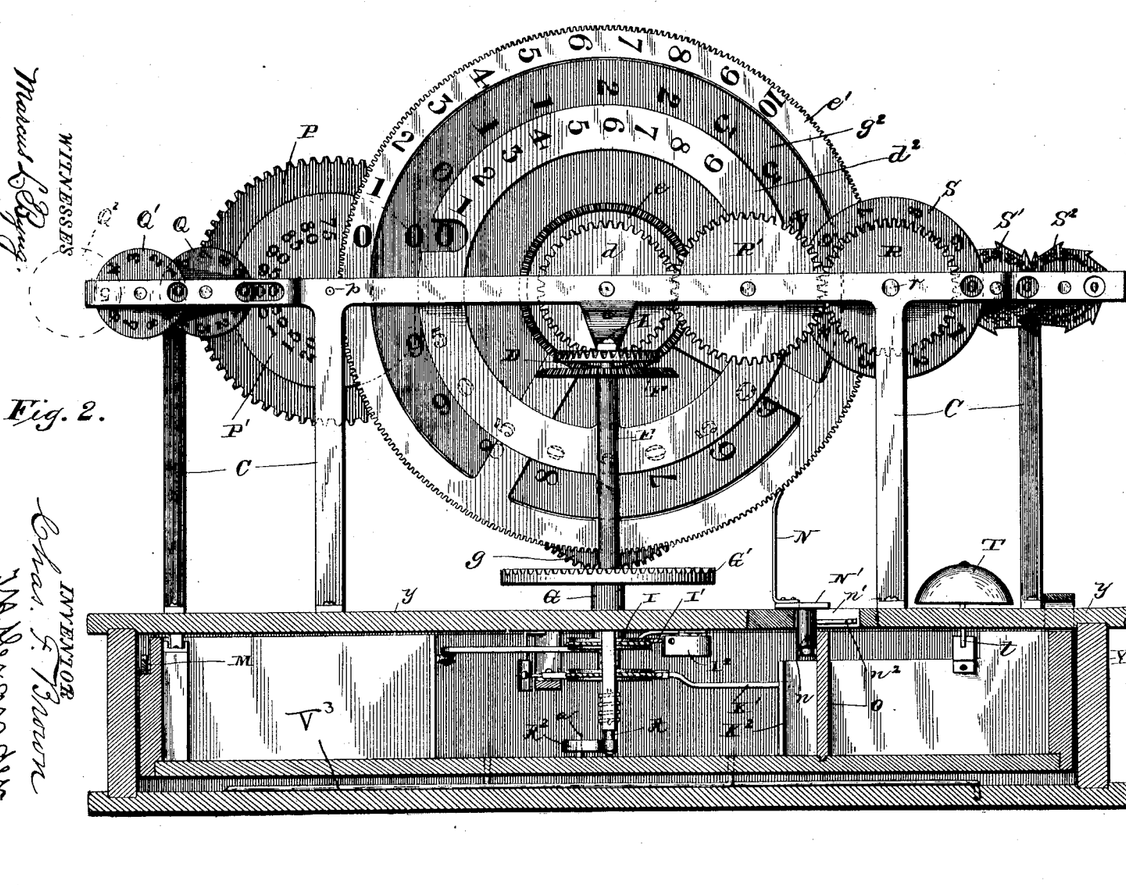
Fig. 2 is a transverse sectional and face view of the machine with top removed.
Figure 3:
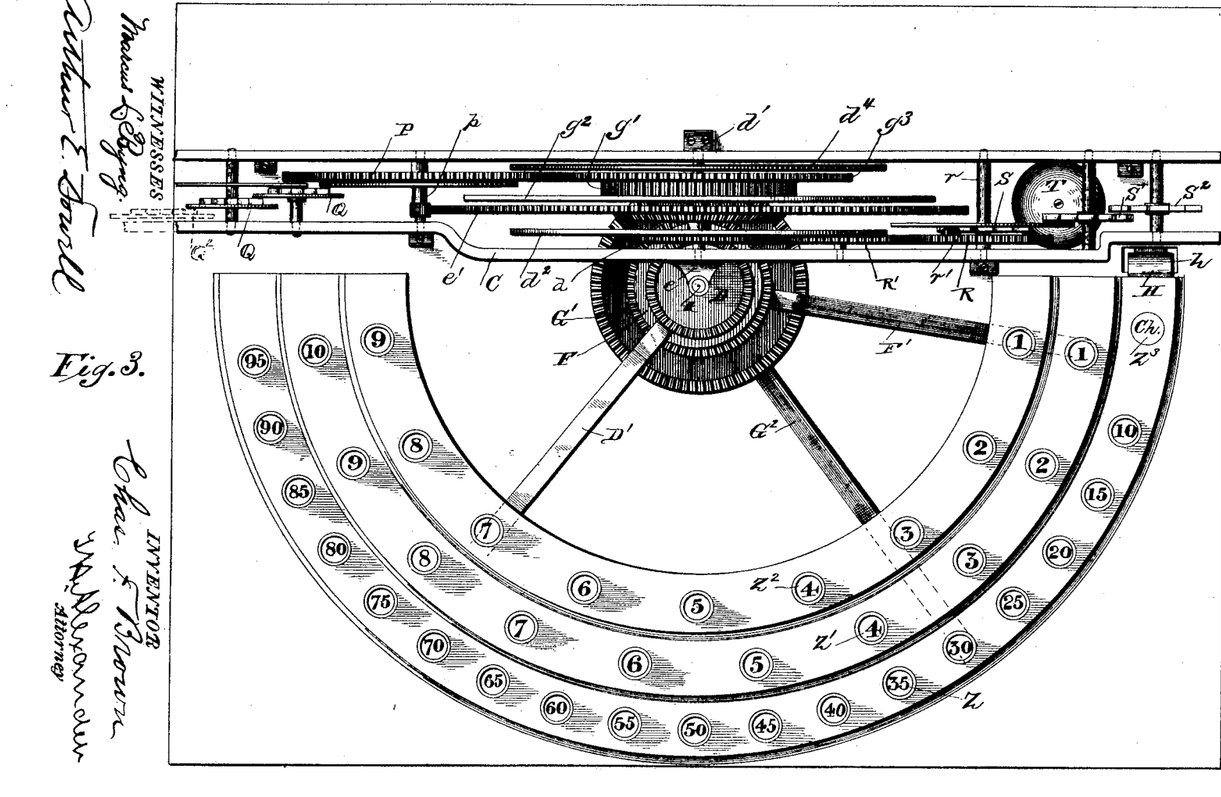
Fig. 3 is a plan view thereof with top removed.
Figure 4:
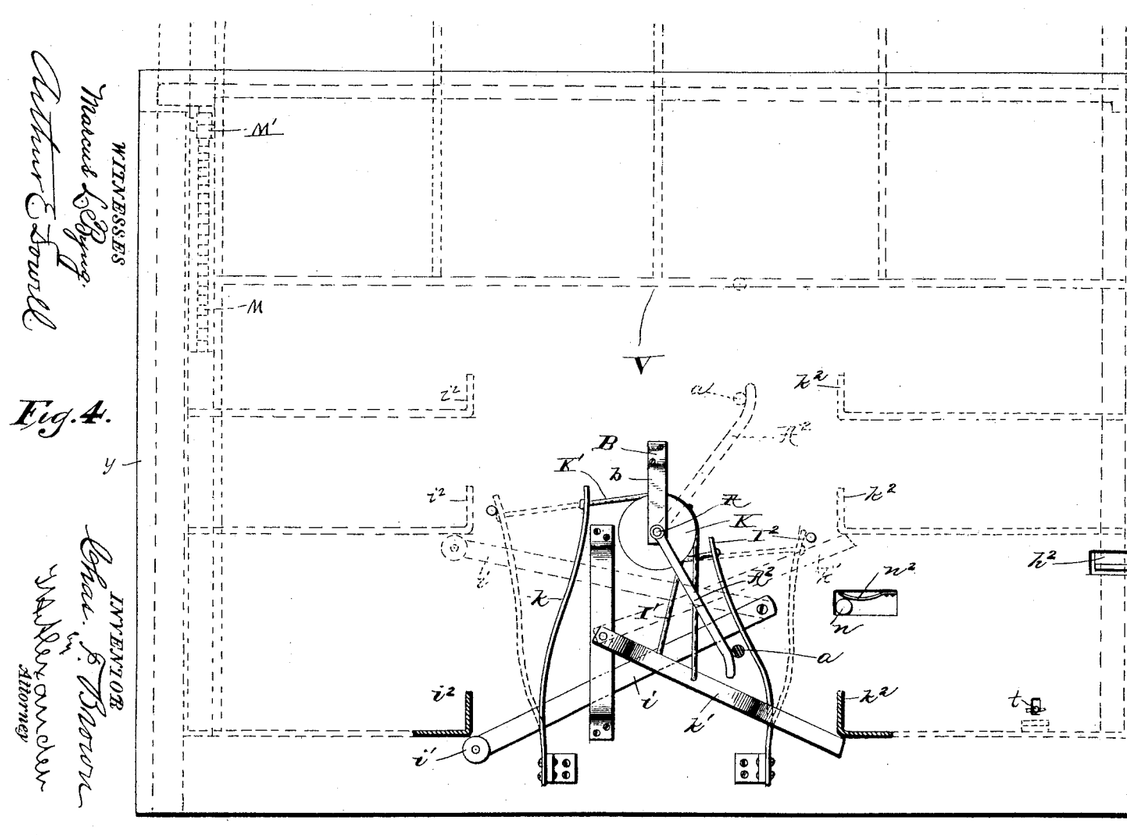
Fig. 4 is a view looking upwardly at the bottom of the device, showing the shaft-controlling devices and indicating the drawer in dotted lines in various positions.

Referring to the drawings, A designates a short vertical shaft, the lower end of which passes through an opening in the top $y$ of the stand or box Y, on which the registering devices are supported, and is journaled and supported in an arm $b$ of a bracket-casting B, secured to and depending from the top. The upper end of this shaft A is journaled in a bracket $c$, attached to the frame C, which supports the several dials of the machine. On the upper end of shaft A is fixed a horizontal small geared disk D, which meshes with a gear $d$, fixed on a short horizontal shaft $d'$, journaled in frame C above and lying at right angles to shaft A, as shown in Fig. 1, and on shaft $d'$ and rigidly connected with gear $d$ is a dial $d^2$ (the units-dial.)

E designates a tubular shaft or sleeve surrounding shaft A, but shorter than the latter, and supported at bottom on an arm $b'$ of bracket B and rising nearly to disk D, and on the upper end thereof close to disk D is fixed a gear-disk F, which meshes with a gear $e$, loosely journaled on shaft $d'$, just behind gear $d$, and loosely mounted on shaft $d'$, but fixed to gear $e$, is a large dial $e'$, (the dollar-dial.)

G designates a second tubular shaft or sleeve, shorter than sleeve E and slipped on the same, being supported at bottom in an arm $b^2$ of bracket B and extending upward through the top $y$ but a short distance, and on its upper end is fixed a large disk G', having teeth on its periphery adapted to engage with a gear $g$, journaled on a support attached to an upright of frame C, and which in turn meshes with a gear $g'$, loosely mounted on shaft $d'$ in rear of dial $e'$, and between gear $g'$ and dial $e'$ is a dial $g^2$, (the tens-dial,) loosely journaled on shaft $d'$, but fixed to gear $g'$, and $g^3$ is a larger gear-wheel loosely mounted on shaft D, but fixed to gear $g'$ and hereinafter referred to.

$G^2$ is an arm fixed to disk $G'$ and projecting radially and horizontally therefrom. The end of said arm lies beneath the lower front row of keys Z Z, which are arranged in about a semicircle, having shaft A as an axis, the keys being supported in a metallic bank, hereinafter described.

H designates a semicircular lever, which underlies the keys Z, and is pivoted near its ends by lugs or pins $H'$ to ears $H^2$ on bracket-pieces $H^3$, attached to the top $y$ or other suitable support. The right-hand end $h$ of lever H projects beyond its fulcrum or pivot and may be bent down into a latch head or dog $h'$, which depends through an opening in the top $y$, and is adapted to engage with a catch on the drawer, hereinafter referred to.

The lever H is upheld by a spring $h^2$, as indicated in the drawings, and arm $G^2$ rests upon and sweeps over the top surface of said lever when disk $G'$ is revolved; but when arm $G^2$ is in normal position, which is when the disk $G'$ is turned so as to bring arm $G^2$ near the right-hand pivots of the lever, it engages and is retained by a shoulder $h^3$ on the lever until such lever is forcibly depressed. When shoulder $h^3$ is lowered, arm $G^2$ is released and dog $h'$ is disengaged from the drawer. Shaft G is controlled by springs, as hereinafter described, which, if arm $G^2$ be released from lever H, will instantly cause the shaft G, disk $G'$, and arm $G^2$ to revolve and also the parts geared to disk $G'$ until arm $G^2$ be stopped.

Figure 9:
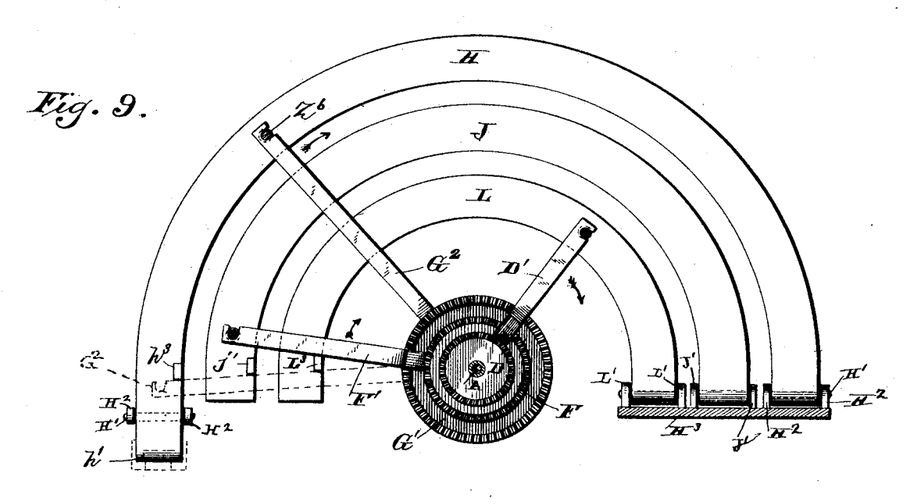
Fig. 9 is a detail top view of the curved levers and coacting arms.

The key-bank, as shown, is formed in three tiers, one above the other, and semicircular and concentric, the lowest being the largest in diameter. The tiers are stepped so that there are three vertical pieces $w$, connected by two intermediate horizontal pieces $w'$ and top $w^2$, and W W designate semicircular concentric flanges springing inwardly from pieces $w$ below the portions $w'$ and $w^2$. The stems $Z^6$ of the keys in the several banks pass and play through corresponding openings in the adjoining portions $w'$ $w^2$ and flanges W, as shown, and on the stems between the flanges are coiled springs $W'$, which are arranged to lift the stems and hold them up after depression. The lower ends of the stems have heads $W^2$, and on their upper ends are finger-buttons $W^3$ of ordinary construction and marked with numerals corresponding to numbers on the dial the keys are to operate. The lower keys Z operate the tens-dial $g^2$ and are marked with numbers "10" to "95," beginning at the right-hand side. The dial $g^2$ has on its opposite faces near its periphery "00" and the numbers "10," "15," &c., to "95" in regular progression and succession, so that if revolved to the right it will bring successive numbers opposite a sight-opening $Y'$ in the front of the machine, which opening is located opposite the left-hand periphery of the disks, looking toward them over the keys and slightly above the axes thereof. Now when a key Z is depressed it first strikes lever H, depresses the same, and releases arm $G^2$, which is instantly swept around by the action of the spring-controlled disk $G'$ until the end of the arm $G^2$ strikes the stem of the depressed key, when the movement of the arm and disk is arrested. Preferably the arm $G^2$ has a slotted head or fork $G^3$ on its end, which catches the key-stem above the head $W^2$ and holds the key down until the disk $G'$ and arm are started back to first position. This movement of disk $G'$ through its gearing imparts a rotary movement to dial $g^2$, and rotary movement of the dial is of course governed by the rotary movement of the disk $G'$ and sweep of arm $G^2$, and the sweep of the arm is regulated by the location of the key depressed—say that there are eighteen numbered keys in the lower bank, the key at the right-hand side, when depressed would stop arm $G^2$ after it had made one-eighteenth of its full sweep, and the gearing between disk $G'$ and dial $g^2$ is so arranged that the dial will be turned in this instance (when the first key is depressed) just one-eighteenth of its necessary rotative movement, so that the first number "10" on its face will appear at the sight-opening. If the last key in the lower bank be depressed, the arm $G^2$ and its disk $G'$ will make their complete sweep, and the dial $g^2$ will consequently be so far revolved as to bring its last number "95" opposite the sight-opening. When the arm and disk are brought back to normal position, the gearing reverses the movement of dial $g^2$ and brings it back to normal position also, so that "00" shows at the sight-opening. Of course if any intermediate key is depressed the sweep of arm $G^2$ and revolution of dial $g^2$ will be proportionate. On the lower end of shaft G is fixed a grooved pulley I, to which is connected a chain or cord $I'$, one end of which is fixed to a stout spring $I^2$, that is fastened to the under side of top $y$, and the other end to a lever $i$, pivoted at one end to a pin or stud attached to top $y$ and lying transversely to the top and in rear of the shafts. The spring $I^2$ always tends to rotate shaft G, so as to revolve disk $G'$ and its arm $G^2$ in the direction indicated by the arrows in Fig. 9, which is to cause the arm to travel over the lever H when released, as described, and lever $i$ is used to return the parts to original position and to thereby tension the spring. The end of lever $i$ may be provided with a friction-roller $i'$, and it projects in the path of a stud $i^2$, fixed in the drawer V, which, when the drawer is pushed inward, engages the free end of the lever and forces it backward, thus revolving shaft G, tension-spring $I^2$, and bringing the disk $G'$, arm $G^2$, and dial $g^2$ back to normal or naught position each time the drawer is pushed in. Of course as the drawer moves outward the lever $i$ is freed and spring $I^2$ is free to operate the parts, as specified.

J designates a semicircular lever pivoted at its rear or left-hand end between lugs $J'$, attached to the key-bank casting or other suitable support, and lying beneath the second row of keys, being upheld in normal position by a spring $J^2$.

F′ designates an arm attached to disk F and bent downward and outward, so that its end overlies lever J, as indicated, and engages a catch or shoulder $j'$ on the free end of the lever J, by which arm F′ and disk F are normally locked; but when lever J is depressed by the depression of either of keys Z′ the arm F′ is released, and as shaft (or tube) E is spring-actuated similarly to shaft G the disk F and arm F′ revolve until they are stopped by the arm striking the depressed key-stem, and this revolution of disk F through gear $e$ causes the revolution of dial $e'$ until the number on its periphery corresponding to the key depressed appears at the sight-opening. The operation of these devices for controlling the dollar-dial $e'$ is substantially identical with the operation of the devices for working the tens-dial, before described, and will be readily comprehended. When the arm F′ is brought back into first position and locked, the dial $e'$ is also returned to normal position and 0 shows at the sight-opening. The dial $e'$ may have any desired number of divisions, calculated according to the number of keys Z′ in the second row, ten being shown in the drawings. The dollar-dial $e'$ is larger than the tens-dial $g^2$ and stands close thereto; but it is cut out, or in fact is scarcely more than an annular plate mounted on gear $e$, so that the numbers on dial $g^2$ show through the opening in dial $e'$, looking at them from the key side.

In order to unlock the drawer when lever J is depressed, as shown in Fig. 1, I use a bent push-rod $j^2$, which is arranged beneath the key-bank, and its lower end rests upon lever H, but not in the way of arm $G^2$, while the upper end of this piece lies just beneath lever J, and when the latter is depressed the wire causes lever H to be slightly depressed, also sufficient to disengage the dog $h'$ from the drawer, but not enough to release arm $G^2$ from lever H, so that the tens-dial mechanism will not be operated except when one of the keys Z is depressed. On the lower end of tube E is fixed a small pulley K, to which is attached a cord or chain K′, one end of which is fixed to a stout spring $k$, lying opposite spring $I^2$ and similarly attached to the top $y$, and the other end of the cord is attached to a lever $k'$, standing transversely to the top and behind the shafts and pivoted at the end opposite the pivot of lever $i$ and lying in a plane below the same so as not to interfere therewith. The free end of this lever is adapted to be engaged by a stud $k^2$ in the drawer when the latter is pushed inward, so that the tube E, disk F, and arm F′, and connected parts will be brought back to normal position and the spring $k$ tensioned when the drawer is closed, similarly to the actuating devices of the tens-dial before described.

L designates a lever similar to lever J and pivoted at one end between ears L′, attached to the key-bank casting or other convenient support, so that this lever lies just beneath the upper row of keys $Z^2$, and it is upheld by spring $L^2$.

D′ is an arm similar to arms F′ $G^2$, attached to disk D and bent down under the first row of keys and overlying the lever L, and normally held in engagement with a catch or notch $L^3$ on the lever, as indicated. When lever L is depressed by a key $Z^2$, arm D′ is released, and as shaft A is spring-controlled also the arm and disk D turn until stopped by striking the depressed key-stem. This movement of disk D, through intermeshing gear $d$, revolves the units-dial $d^2$ and brings a number thereon corresponding to the number of the key depressed opposite the sight-opening. Lever L has a depressing-arm $l$ attached to it and depending below and in front of lever J in position to engage push-rod $j^2$, so that when lever L is depressed lever H will be operated also to release the drawer, as before described, without releasing arm $G^2$ or affecting lever J at all.

On the lower end of shaft A is a stout coiled spring A′, which is so arranged as to rotate disk D and arm D′, when the latter is released, in the desired direction, and on the lower end of the shaft is fixed a horizontal arm $A^2$, having a curved end, which arm rotates with the shaft, but is so arranged that it is impinged against by a pin $a$, fixed to the drawer-bottom, and when the drawer is pushed inward the arm is turned backward, bringing shaft A, disk D, and arm D′ to original position, and tensioning spring A′ ready to operate the shaft again when arm D′ is released by depression of lever L.

The operation of the cents-dial mechanisms and the arrangement of numbers on the same are substantially like that described for the tens-dial and will be, therefore, understood without entering into detail explanation thereof. Of course there is no necessity for any but unit-numerals on the dial $d^2$. This dial partly overlies dial $g^2$, so that it obscures the inner figure of each number thereon; but when dial $d^2$ is at rest in normal position it is cut away opposite the sight-opening, so that the entire number on dial $g^2$ can be seen therethrough, except when dial $d^2$ is operated also. This dial $d^2$ is therefore smaller than dial $g^2$, and indeed need not be more than a segment. Now it will be observed that owing to the arrangement of dials, looking through the sight-opening, the numbers on each dial when they are shifted will be seen through this opening in close relation. For instance, if the two-dollar key Z′, thirty-cent key Z, and seven-cent key $Z^2$ be depressed the several dials will be shifted so that at the sight-opening will be seen 237, as if one number only, although each figure is on a different dial, the 0 in the 30 being obscured by the 7 on the units-dial. By this means the exact amount of sale is seen at a glance without any mental effort whatever, as is required by ordinary machines wherein the dollars and cents appear at different points on different cards or dials. There is no danger of any confusion in the numbers, as each dial mechanism is independent of the others, and as the arms $G^2$ $F'$ $D'$ catch and hold the stems depressed until the drawer is closed there is no danger of either arm slipping past the key depressed while the drawer is open. The drawer is released by the first key depressed, no matter in which row, and while the drawer is opening or opened a key in another row or in both the other rows can be depressed, whereby its dial will be shifted as described; but only one key in each row can be depressed with any effect on the dials at a single opening of the drawer, and before either dial can be again shifted the drawer must be closed.

Figures 5, 6, 7, 8:
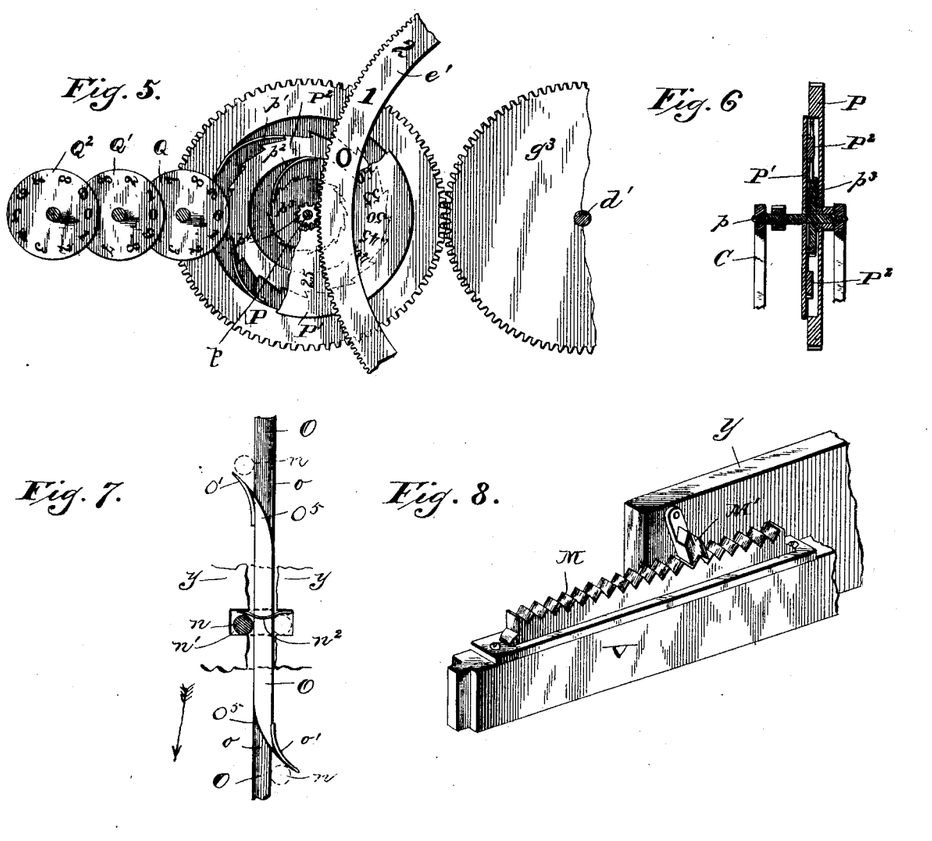
Fig. 5 is a detail face and sectional view of the registering or calculating wheels.
Fig. 6 is a vertical sectional view through the same.
Fig. 7 is a detail view of the dogging devices for the large dial.
Fig. 8 is a perspective view in detail of the drawer-locking devices.

It will be observed that none of the dial mechanisms can be operated until the drawer opens, and that as the drawer moves inward each of the dials will be brought back to zero and only blanks appear at the sight-openings. The drawer is thrown outward by bent springs. The depression of any key releases the drawer and it immediately springs open, and in order to prevent its being surreptitiously closed or opened without a proper register I employ the automatic controlling device shown clearly in detail-figure. This consists of a serrated rack M, fixed to one side of the drawer, and a double-tongued dog $M'$, pivoted to the side of the case above the rack. When the drawer is entirely closed, this dog hangs loosely beside the end of the rack; but as the drawer begins to open it is raised into engagement therewith, as indicated in Fig. 8, so that it is impossible to close the drawer; but it must be drawn out until the dog slips off the other end of the rack. Then if the drawer is pushed inward the dog swings into the opposite position and engages the rack, so that the drawer must be entirely closed before it can be again drawn outward. The dog must travel entirely over the rack at each movement of the drawer in opening or closing before the motion of the drawer can be reversed. The drawer may be provided with friction-rollers $m$ in its upper edges, as the springs tend to push it upward as well as outward. The back of the drawer may be cut away, so as not to interfere with the depending springs and levers, thus permitting the drawer to be drawn entirely open.

The dials $e'$ and $g^2$ are numbered on both faces; but dial $d^2$ is obscured, looking from the rear, by the other dials and gearing, therefore I employ a supplementary units-dial $d^4$, which is keyed on shaft $d'$ in rear of all the other gears and dials thereon, and the face of dial $d^4$ is numbered correspondingly to dial $d^2$ and has the same relation to the other dials, so that the purchaser looking through a sight-opening $y^2$ in the back of the casing sees the same figures that appear to the operator through sight-opening $Y'$. In order to prevent any rebound of dial $e'$, I may, if desired, employ an automatic dogging device consisting of a spring-dog N, mounted on a sliding plate $N'$, having a depending lug $n$, passing through a slot $n'$ in top $y$, a spring $n^2$ being fixed in the slot and bearing against the lug to retain the same when shifted. A partition O is made in the drawer lying just beneath this slot, and the lug $n$ impinges against the side edges of this partition. At the ends of partition O are shoulders $O^5$, which are rounded off in opposite directions laterally, and short curved spring-plates $O'$ $o'$ are fixed thereto, which point in opposite directions. As the drawer moves forward, as indicated by the arrow, Fig. 7, in opening, the plate $o'$ impinges against the lug $n$ and forces the latter to the left-hand side of the partition, thus moving dog N into engagement with the edge of dial $e'$, which is gear-toothed, and consequently backlash of the dial is prevented while the drawer is opening; but when fully opened the drawer brings plate $O'$ past lug $n$, and though the plate $O'$ yields in order to pass the lug, yet when past it springs back into such position that when the drawer is moved inward plate $O'$ impinges against the lug and moves it backward, so that it passes to the other side of the partition, thus disengaging dog N from the dial $e'$. As the drawer is closed, however, plate $o'$ slips past the lug and instantly assumes such position in relation thereto that when the drawer is opened the lug $n$ and dog N are shifted to the other side of the partition ready to engage dial $e'$. Thus the dial is only dogged when the drawer is opening.

T designates a bell mounted on a support beside the registering-wheels, and $t$ is a pivoted clapper-bearing arm depending through a slot in top $y$, and which will be struck by the rear edge of the drawer as the latter opens, sounding the bell.

If a change-key is desired in the machine, a key $Z^3$ in the lower row may be used. This key is at the extreme end of the row and when depressed imparts a slight movement to lever H, only sufficient to cause it to disengage the latch $V^2$ on the side of the drawer, permitting the latter to swing open; but as all the arms $G^2$, $F'$, and $D'$ are locked the dials do not move and no register is made. The drawer is operated by springs $V^3$, which are simple wires having one end fastened to the bottom of the case and the other to the bottom of drawer, and when the drawer is pushed inward these springs are bent into a short convolute, and when the drawer is released they spring outward, throwing the drawer forcibly and quickly open.

P designates a gear-wheel equal in diameter to gear $g^3$ and meshing therewith, being loosely journaled on a short shaft $p$, having bearings in the frame C at one side of the dials.

$P'$ designates a small registering-wheel loosely mounted on the shaft, and P² is an annular ratchet attached to the rear face of the wheel P′ and having ratchet-teeth on its periphery engaged by a dog $p'$ on gear P, so that the wheel will be revolved by gear P in one direction only.

$p^3$ is a small ratchet fixed on the shaft $p$ between the dial and gear P within the annulus P² and engaged by a dog $p^2$ attached thereto, so that shaft $p$ will impart a motion to the wheel through the ratchets in one direction only, and that the same as is imparted by gear P.

$p^4$ is a small pinion on shaft $p$, meshing with the teeth on the periphery of dial $e'$, as shown. Pinion $p^4$ has ten teeth, and for each numbered division on dial $e'$ there are ten teeth on its periphery, so that as dial $e'$ is revolved it imparts one complete revolution to shaft $p$ for each division on its face passing thereby. For instance, if key Z′, numbered $3, be depressed, dial $e'$ would revolve shaft $p$ three times, and consequently wheel P′ would be revolved three times during the forward movement of dial $e'$; but as the latter moved back to normal position, though shaft $p$ would be revolved backward three times, wheel P′ would be stationary, so far as its movement by dial $e'$ was concerned, because of the ratchet connections. The gear $g^3$ being connected to dial $g^2$ and gear P being of equal size with gear $g^3$, when dial $g^2$ is moved a corresponding movement will be given to gear P, and through it to wheel P′. For instance, if dial $g^2$ moves so as to disclose Fig. 25 at the sight-opening, wheel P′ would be moved (when the dial $g^2$ returns backward to original position, however,) so as to disclose Fig. 25 at the sight-opening or indicating-point. Wheel P′ is divided into twenty parts and makes a complete revolution for each one hundred cents indicated by dial $g^2$ or each "$1," indicated by dial $e'$. If dial $g^2$ were moved so as to shift wheel P′ one-quarter of a revolution (indicating twenty-five cents) and then dial $e'$ were shifted to show "$1," wheel P′ would be given a complete revolution and yet indicate but twenty-five. Then if dial $g^2$ were moved to indicate fifty cents, wheel P′ would be moved a one-half revolution, indicating seventy-five cents, and so on. It will be observed that one dial operates the wheel P′ on its forward movement, the other on its return, so that if both dials be operated simultaneously by the simultaneous depression of two keys, the complete sum would be transferred to the registering device by the time the dials were returned to normal position. Wheel P′ is arranged in connection with an ordinary series of registering-wheels Q Q′ Q², &c., and imparts one revolution to wheel Q for every ten made by itself, wheel Q imparts one revolution to wheel Q′ for every ten it makes, and so on to any number of wheels. Wheel Q indicates any number of dollars by tens, from ten dollars to one hundred dollars, wheel Q′ any number by hundreds, from one hundred dollars to one thousand dollars, and so on.

The units-dial $d^2$ in the present case is not geared to operate wheel P′; but instead it has a separate adding mechanism located at the opposite side of the machine. In this case a gear-wheel R is mounted on a shaft $r$, journaled in frame C at the side opposite shaft $p$. Gear R is exactly similar to gear $d$, and is driven therefrom by an intermediate gear R′, journaled on a stub-shaft fixed to frame C, as shown. In rear of gear R is a registering-wheel S, loosely mounted on shaft $r$, and having a ratchet $r'$, engaged by a pawl on gear R, so that a rotary movement in one direction only is imparted through gear R to wheel S. This wheel is divided into ten spaces, bearing numbers "1" to "10," and it coacts with a series of other registering-wheels S′ S², &c., imparting one rotation to wheel S′ for each single revolution made by itself, and wheel S′ imparts one rotation to wheel S² for every ten revolutions it makes. Wheel S′ registers "tens" up to ninety and wheel S² registers "dollars" up to nine, and other wheels may be added.

Figures 10, 12:
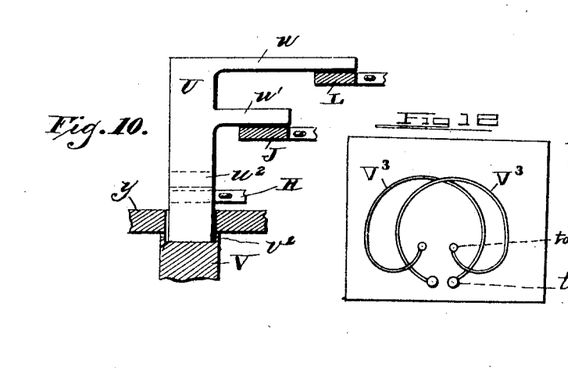
Figs. 10 and 11 are detail views illustrating a modification of the drawer-releasing device.
Fig. 12 is a small detail plan view of the drawer-operating springs.
Figure 11:
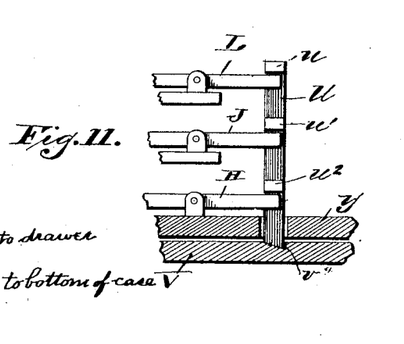

The several registering-wheels may be of any convenient or ordinary construction, and mounted in cases attached to the frame C. The registering-wheels are not intended to be disclosed to the public, being hidden in the casing, but accessible through suitable doors therein. The casing may be of any desired form or finish. Instead of forming the dog $h'$ on the end of lever H, thereby necessitating the depression of this lever when either the change-key or any key in the banks is depressed before the drawer can be opened, I may use an independent latching device, operated by any of the levers H, L, or J independently—such, for instance, as the device shown in Figs. 10 and 11. In these figures a vertical latch-piece U is used, playing through an opening in the top $y$, and normally being engaged with the latch $v^2$ on the drawer. The several levers H, L, and J are pivoted at both ends, like lever H, already described, so that at the end adjoining the latch they have a projection extending beyond the pivots, and the latch U has vertical arms $u$ $u'$ $u^2$, overreaching these projecting ends of the several levers, respectively, so that when either lever is depressed the latch U will be elevated, releasing the drawer without disturbance of the other levers. The latch U may be depressed by a spring, so that it is always in readiness to catch and lock the drawer when closed. The change-key in such case may be conveniently arranged, so as to disengage the latch without depressing either of the key-levers H, L, or J.

It is obvious that the machine can be built with one, two, or three, or even more dials, if desired, without departing from the essence of the invention, and I do not intend to limit myself to the use of any specific number of dials and their operating mechanism; also various modifications might be made in or substituted for the described spring-controlling devices of the shafts and in the construction of the parts in fitting up the machines for market.

Having described my invention, what I claim as new, and desire to secure by Letters Patent thereon, is—

1. The combination, with a rotatable dial-plate, of a revoluble disk adapted to rotate the plate and having a radially-projecting arm with a pivoted lever underlying said arm adapted to engage said arm and hold the parts normally locked, and a key-stem adapted to depress said lever, substantially as specified.

2. The combination, with a revoluble dial-plate, of a rotatable disk lying at right angles to said dial-plate, and gearing for operating said dial-plate therefrom, with a pivoted lever and devices for normally locking said disk thereby, and a series of key-stems adapted to depress the lever and to serve as stops to limit the revolution of the disk, substantially as described.

3. The combination of the shaft, an arm projecting radially therefrom, and a pivoted lever adapted to lock said arm and over which the said arm sweeps when the shaft revolves, with a series of key-stems adapted to depress said lever and to serve as stops to limit the movement of the arm, substantially as set forth.

4. The combination of the rotatable shaft, an arm projecting therefrom, and a pivoted lever over which the arm sweeps when revolved, with a series of key-stems standing parallel with the shaft adapted to depress the lever and serve as stops to limit the movement of the arm, and the indicating mechanisms operated from said shaft, substantially as described.

5. The combination of a vertical spring-controlled shaft, an arm projecting therefrom, and an indicating-dial driven by gearing from said shaft, with a horizontal pivoted lever adapted to engage and lock the arm, and key-stems for depressing said lever and releasing the arm, substantially as specified.

6. The combination of a spring-controlled shaft, an arm attached thereto, and indicating mechanism operated therefrom, with a pivoted lever adapted to normally engage and lock the arm, key-stems standing parallel with the shaft and adapted to depress the lever to release the arm and to limit the movement of the latter, and mechanism for returning the shaft and arm to normal position, substantially as described.

7. The combination of a vertical spring-controlled shaft, a toothed disk thereon, an arm projecting from said disk, and a dial operated by gearing from said disk, a sliding drawer, a catch engaging the same, and mechanism for operating said shaft and releasing the drawer, substantially as described.

8. The combination of a shaft, a dial geared to and operated from said shaft, a drawer and a locking device therefor, with a pivoted lever and the devices whereby the shaft and drawer are locked, both controlled by said lever, and a key-stem adapted to depress the lever, thereby releasing the drawer and permitting the shaft to revolve, substantially as described.

9. The combination of a shaft, an arm projecting therefrom, a dial geared thereto, and a drawer and locking devices therefor, with a pivoted lever lying beneath and normally engaging said arm arranged to operate said locking devices and to release the arm when depressed, and keys for depressing the lever, substantially as specified.

10. The combination of the shaft having a projecting arm, an indicating-dial geared thereto and operated thereby, and a drawer with a pivoted lever having a dog at one end engaging and locking the drawer and adapted to engage and hold the arm until depressed, and key-stems arranged to depress the lever, thereby releasing the drawer and permitting the shaft to revolve, substantially as set forth.

11. The combination of the shaft, an indicating-dial operated thereby, a spring connected to the lower end of the shaft, and the lever for tensioning said spring and turning the shaft back to normal position, with a drawer adapted to engage said lever when pushed inward and to release the same as it opens, substantially as specified.

12. The combination of the shaft, the indicating-dial operated therefrom, the springs for revolving said shaft in one direction, a drawer and locking devices therefor, and pin and lever, whereby the shaft is brought back to normal position and the springs tightened when the drawer is closed, with mechanism, substantially as described, for releasing the drawer and for limiting the forward revolution of the shaft, substantially as set forth.

13. The combination of the vertical shaft, a spring, a lever, and a cord or chain connected to the lower end of the shaft and to the lever and spring, respectively, with a sliding drawer provided with a stop adapted to engage said lever and thereby tension the spring and bring the shaft to normal position when the drawer is closed, substantially as described.

14. The combination, with an indicating toothed dial, mechanism for rotating the same, and a sliding drawer with a movable dog located below and at the periphery of the dial, adapted to engage the teeth of the dial, of devices, substantially as described, whereby the dog is thrown into contact with the dial as the drawer opens and thrown out of contact therewith as the drawer closes, substantially as specified.

15. The combination of the toothed dial and a movable dog adapted to engage the same, having a depending lug, with a sliding drawer, a partition therein having oppositely-curved spring-wings at its ends adapted to engage the depending lug and shift the dog into or out of engagement with the dial as the drawer is opened or closed, substantially as set forth.

16. The combination of the shaft, a toothed disk thereon, a sleeve on said shaft, and a disk thereon, a pair of revoluble indicating-dials respectively operated by gearing from said shaft and sleeve, a pair of pivoted levers, and key-stems adapted to independently control the movements of the shaft and sleeve, substantially as and for the purpose described.

17. The combination of the shaft, the sleeve thereon, and the disks mounted on said shaft and sleeve, respectively, and provided with latererally-projecting arms, with a pair of pivoted levers respectively engaged by said arms, and the key-stems adapted to depress the levers independently and to release the arms and to limit the movement thereof, substantially as set forth.

18. The combination of the shaft, the sleeve thereon, and the pair of revoluble dials respectively but independently operated by gearing from the shaft and sleeve, with arms projecting from said shaft and sleeve, a pair of pivoted levers adapted to normally engage said arms, respectively, and key-stems adapted to depress said levers and to limit the revolution of the shafts and dials, substantially as and for the purpose described.

19. The combination of the shaft, the sleeve thereon, the pair of revoluble dials, respectively but independently operated by gearing from the shaft and sleeve, with arms projecting from said shaft and sleeve, a pair of pivoted levers adapted to normally engage said arms, respectively, and key-stems adapted to depress said levers and to limit the revolution of the shafts and dials, substantially as described, and mechanism for returning the shafts and dials to normal position after the depression of a lever, substantially as and for the purpose specified.

20. In a cash-registering machine, the combination of a shaft, a sleeve thereon, the independent dials, respectively operated from the shaft and sleeve, and arms projecting from said shaft and sleeve, the pivoted levers respectively engaging said arms normally, the key-stems adapted to depress the same and to limit the sweep of the arms, a sliding drawer and mechanism for releasing the same upon the depression of either lever, and mechanism whereby the shaft and dials are brought back to first position upon the closing of the drawer, substantially as described.

21. The combination of the pair of dials, one having a toothed periphery, a shaft journaled beside the same and having a pinion engaging the toothed dial, a loose gear-wheel on said shaft operated by gearing from the other disk, a registering-wheel also loosely journaled on said shaft, and a ratchet-wheel fixed to said wheel and engaged by a dog fixed to the gear, and a ratchet fixed on the shaft and engaged by a dog on the wheel or other ratchet, whereby a rotation in one direction only is imparted to the wheel though the dials revolve in opposite directions to each other and alternately, substantially as and for the purpose set forth.

22. In a cash-register, the combination of two independently-revoluble dials with a registering device consisting of a shaft $p$, geared to one dial, a ratchet $p^3$, fixed on said shaft, a gear-wheel P, loosely mounted thereon and operated from the other dial, and the loose annular ratchet $P^2$, engaged by a dog attached to wheel P and having a dog engaging ratchet $p^3$, whereby a rotary movement in one direction only is imparted to said shaft from the dials, substantially as described.

23. The combination, with the shaft, the tube thereon, the sleeve on said tube, and the dials independently mounted on a common shaft and respectively operated by gearing from the shaft, tube, and sleeve, of mechanism for automatically rotating the shaft, tube, and sleeve independently, with arms projecting from the tube, shaft, and sleeve, the pivoted key-levers engaging said arms, and key-stems adapted to operate the levers to release the arms and limit the movement thereof also, substantially as and for the purpose described.

24. The combination, with the shaft, the tube thereon, the sleeve on said tube, and the dials independently mounted on a common shaft and respectively operated by gearing from the shaft, tube, and sleeve, of mechanism for automatically rotating the shaft, tube, and sleeve independently, with arms projecting from the shaft, tube, and sleeve, the pivoted key-levers engaging said arms, and key-stems adapted to operate the levers to release the arms and limit the movement thereof also, a drawer, and locking devices therefor operated by said levers, substantially as described.

25. The combination of the shaft, the sleeve thereon, the pair of revoluble dials mounted on the same shaft in close relation to each other and respectively but independently operated by gearing from the shaft and sleeve, with arms projecting from said shaft and sleeve, a pair of pivoted levers adapted to normally engage said arms, respectively, and key-stems adapted to depress said levers and to limit the revolution of the shaft and dials, and mechanism, substantially as described, for automatically returning the parts to normal position after each register, substantially as and for the purpose specified.

26. The combination, with the shaft, the tube thereon, the sleeve on said tube, and the dials independently mounted on a common shaft and respectively operated by gearing from the shaft, tube, and sleeve, of mechanism for automatically rotating the shaft, tube, and sleeve independently, with arms projecting from the tube, shaft, and sleeve, the pivoted key-levers engaging said arms, and key-stems adapted to operate the levers to release the arms and limit the movement also, and a drawer, locking devices therefor operated from said levers, and mechanism, substantially as described, for automatically returning the parts to normal position when the drawer is closed, substantially as and for the purpose described.

27. The combination, with the shaft and arm having a notched head, of the catch for locking said arm, and a key-stem adapted to cause the release of the arm when depressed and having an enlarged head that is caught by the arm, so as to hold the key depressed until the parts are moved back toward normal position, substantially as and for the purpose specified.

28. The combination, in a cash-register, of a drawer, the three levers arranged one above the other, the lowest being adapted to operate the drawer-locking device, and the key-stems for operating the same, with the push-rod devices whereby the lower lever may be operated upon the depression of either of the upper levers, substantially as described.

29. The combination of the vertical shaft, a toothed disk thereon having a laterally-projecting arm, a rotatable dial and gearing between the same and said disk, and springs for controlling the rotation of the shaft, with a pivoted curved key-lever having a notch engaging said arm and locking the same, a series of key-stems adapted to depress the lever by impinging thereagainst at different points, so as to release the arm and permit it to be revolved with the shaft until it strikes the stem, and a catch on said arm for holding the stem depressed until the arm is drawn backward, substantially as set forth.

30. The combination of the vertical shaft, a toothed disk thereon having a laterally-projecting arm, a rotatable dial and gearing between the same and said disk, and springs for controlling the rotation of the shaft, with a pivoted curved key-lever having a notch engaging said arm and locking the same, a series of key-stems adapted to depress the lever by impinging thereagainst at different points, so as to release the arm and permit it to be revolved with the shaft until it strikes the stem, and a catch on said arm for holding the stem depressed until the arm is drawn backward, and a registering mechanism operated by the movement of the dial in one direction only, substantially as described.

31. The combination of the vertical shaft, a toothed disk thereon, having a laterally-projecting arm, a rotatable dial and gearing between the same and said disk, and springs for controlling the rotation of the shaft, with a pivoted curved key-lever having a notch engaging said arm and locking the same, a series of key-stems adapted to depress the lever by impinging thereagainst at different points, so as to release the arm and permit it to be revolved with the shaft until it strikes the stem, and a catch on said arm for holding the stem depressed until the arm is drawn backward, a sliding drawer, and a dogging device for locking the same operated by said lever when depressed, substantially as and for the purpose specified.

32. The combination of a pair of independently-revoluble dials mounted on the same shaft, a drawer, shafts, gearing, key-levers and key-stems for operating said dials and simultaneously releasing said drawer, and mechanism whereby the drawer causes the return of the dials to normal position when pushed inward, substantially as specified.

33. In a cash-register, the combination of independently-revoluble indicating-dials mounted on one shaft, independent spring-controlled gearing for actuating the same, and a drawer, with key-stems and mechanism for releasing the dials independently upon the depression of the proper keys and for simultaneously releasing the drawer, and mechanism, substantially as described, whereby upon the closing of the drawer the parts are brought back to normal position, substantially as described.

34. The combination of the vertical shaft, a toothed disk thereon having a laterally-projecting arm, a rotatable dial and gearing between the same and disk, and springs for controlling the rotation of the shaft, with a pivoted curved key-lever having a notch engaging said arm and locking the same, a series of key-stems adapted to depress the lever by impinging thereagainst at different points, so as to release the arm and permit it to be revolved with the shaft until it strikes the stem, a catch on said arm for holding the stem depressed until the arm is drawn backward, a sliding drawer and a dogging device for locking the same operated by said lever when depressed, and a swinging dog engaging a rack on the drawer, so that it cannot be partially opened and then closed, or vice versa, substantially as specified.

35. The combination of a shaft, a tube thereon, a sleeve on said tube, and arms projecting laterally from the shaft, tube, and sleeve, and independently-rotatable dials operated from said shaft, tube, and sleeve, respectively, the pivoted key-levers respectively engaging said arms, the key-stems for depressing said levers and limiting the movement of the arms, the sliding drawer, its locking device operated by said levers, and the mechanism, substantially as described, for returning the parts to normal position upon the closing of the drawer, and a registering device for the dials, substantially as and for the purpose set forth.

36. In a cash-register, the combination of a spring-controlled shaft depending into the drawer-space, springs for operating the shaft located in the drawer-space, and indicating devices operated from said shaft, with a sliding drawer, and mechanism, substantially as described, operated by said drawer in closing, whereby the shaft is turned back to normal position and the spring tensioned, but which is disengaged by the drawer as the latter opens, leaving the springs free to revolve the shaft, substantially as specified.

37. In a cash-register, the combination of a shaft, a tube thereon, and a sleeve on said tube, each independently revoluble, and three indicating-dials independently operated by gearing from the shaft, tube, and sleeve, respectively, with mechanism whereby the parts are brought back to normal position after each displacement thereof, substantially as and for the purpose set forth.

38. In a cash-register, the combination of a shaft, an indicating-dial operated therefrom, a tube on said shaft, an indicating-dial operated therefrom, a sleeve on said tube, and an indicating-dial operated therefrom, said shaft, tube, and sleeve depending into the drawer-space and independently supported, with springs for independently operating said shaft, tube, and sleeve, a sliding drawer, and devices thereon adapted to cause the return of the parts to normal position as the drawer is closed, all substantially as specified.

39. The combination of a shaft, a tube thereon, a sleeve on said tube, each having a laterally-projecting arm, and indicating-dials independently operated from said shaft, tube, and sleeve, with the pivoted key-levers respectively engaging said arms, and the key-stems for depressing the levers, substantially as set forth.

40. In a cash-register, the combination of a shaft, a tube thereon, a sleeve on said tube, independently-revoluble indicating-dials respectively operated from said shaft, tube, and sleeve, and springs for automatically rotating the same independently when released, with a drawer, and mechanism, substantially as described, whereby the parts are brought back to normal position upon the closing of the drawer, substantially as described.

41. In a cash-registering machine, the combination of independently-revoluble indicating-dials mounted on one shaft, independent spring-controlled shaft and gearing for operating the dials, the arms attached to said shafts, the key-levers engaging said arms, the key-stems for independently operating the levers to release the dials, and mechanism for returning the dials to normal position after each register, substantially as described.

42. In a cash-register, the combination of a pair of independently-revoluble dials mounted on the same shaft, a drawer, key-stems, a series of concentrically-arranged curved key-levers, and mechanism for independently operating said dials and simultaneously releasing the drawer upon the depression of a key-stem, substantially as described.

In testimony that I claim the foregoing as my own I affix my signature in presence of two witnesses.

CHARLES FRANKLIN BROWN.

Witnesses:
HAM. B. WARING,
HENRY WALDECK.